(12) United States Patent
Nisley et al.

(10) Patent No.: US 6,939,053 B2
(45) Date of Patent: Sep. 6, 2005

(54) SYSTEM AND METHOD FOR MOUNTING A SHAFT WITHIN A HOLLOW MEMBER

(75) Inventors: Donald L. Nisley, Greenville, SC (US); James E. Mickelson, Simpsonville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 29 days.

(21) Appl. No.: 09/938,888

(22) Filed: Aug. 24, 2001

(65) Prior Publication Data
US 2003/0037438 A1 Feb. 27, 2003

(51) Int. Cl.$^7$ .............................................. F16C 27/04
(52) U.S. Cl. ............... 384/538; 29/894.361; 29/898.07; 29/898.08; 403/1; 403/DIG. 8; 403/314; 403/374.4
(58) Field of Search ............ 29/894.361, 898.07, 29/898.08, 898.09; 384/538; 403/1, DIG. 8, 314, 374.4, 350

(56) References Cited

U.S. PATENT DOCUMENTS

| 738,445 | A | * | 9/1903 | Hoffmann | 384/540 |
|---|---|---|---|---|---|
| 851,419 | A | * | 4/1907 | Hess | 384/538 |
| 1,561,443 | A | * | 11/1925 | Searles | 384/542 |
| 2,519,927 | A | * | 8/1950 | Pedu, Jr. | 301/5.7 |
| 2,584,740 | A | * | 2/1952 | Reynolds | 403/350 |
| 2,728,616 | A | * | 12/1955 | Potter | 384/484 |
| 2,740,676 | A | * | 4/1956 | Potter | 384/537 |
| 3,036,872 | A | * | 5/1962 | King, Jr. et al. | 384/537 |
| 3,239,292 | A | * | 3/1966 | Howe, Jr. et al. | 384/541 |
| 3,521,342 | A | * | 7/1970 | Van Dorn et al. | 29/898.067 |
| 4,164,063 | A | * | 8/1979 | Cenko et al. | 419/28 |
| 5,011,306 | A | * | 4/1991 | Martinie | 384/585 |
| 5,489,156 | A | * | 2/1996 | Martinie | 384/538 |
| 5,709,483 | A | * | 1/1998 | Martinie | 384/538 |
| 5,897,214 | A | * | 4/1999 | Nisley | 384/537 |

FOREIGN PATENT DOCUMENTS

| DE | 4107864 | * | 9/1992 |
|---|---|---|---|
| SU | 1810630 | * | 4/1993 |

\* cited by examiner

*Primary Examiner*—Eric Compton
(74) *Attorney, Agent, or Firm*—Patrick S. Yoder; Alexander M. Gerasimow

(57) ABSTRACT

A system is provided for securing a rotating member with respect to a non-rotating member. A hollow member, such as an inner ring of a bearing assembly, includes an extension having an annular outer groove. A tapered sleeve serves to lock the hollow member about a mechanical component, such as a shaft. A nut engageable on the sleeve includes an eccentric front aperture adjacent to a concentric groove, thereby forming a lip of varying depth. The system is engaged by rotation of the nut on the sleeve in one direction, and disassembled by counterrotation of the nut such that a portion of the varying depth lip co-acts with a lip formed by the groove of the hollow member.

23 Claims, 3 Drawing Sheets

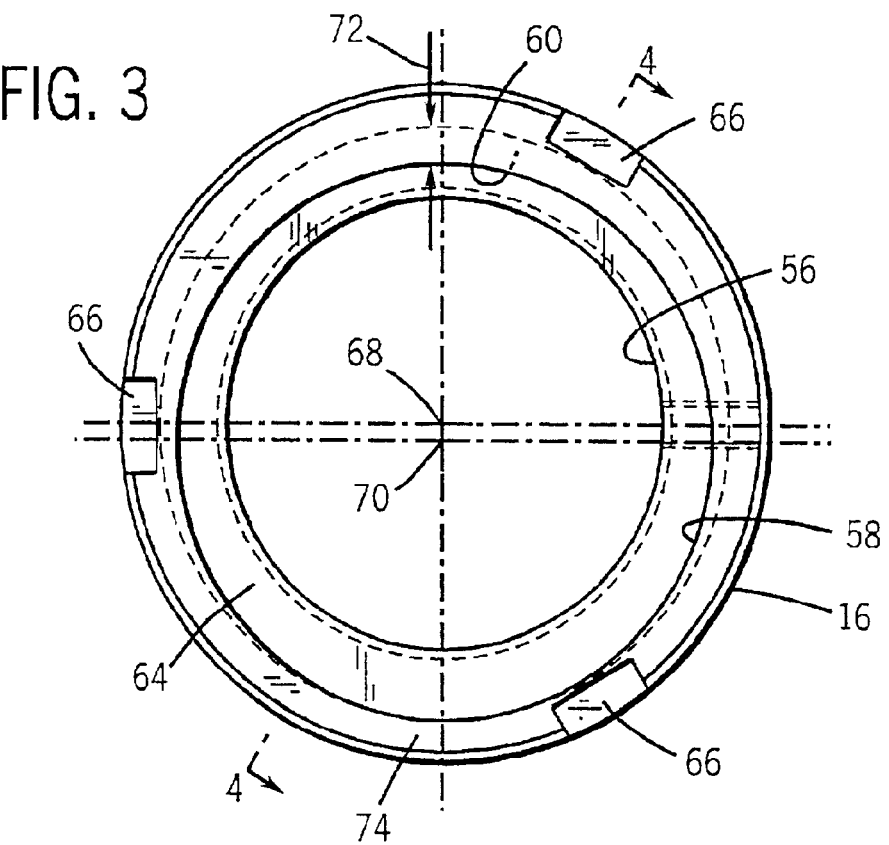
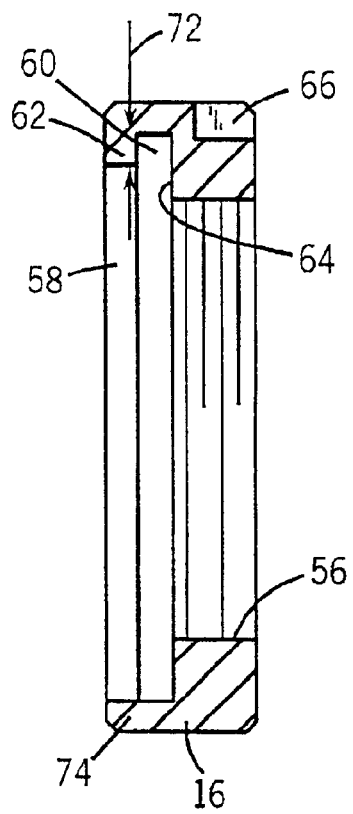

US 6,939,053 B2

SYSTEM AND METHOD FOR MOUNTING A SHAFT WITHIN A HOLLOW MEMBER

BACKGROUND OF THE INVENTION

The present invention relates generally to the field of rotating machinery, and more particularly to arrangements for securing a shaft or similar rotating member in a hollow support member, such as a bearing assembly.

A wide range of rotating machinery is known and currently in use in industrial and other applications. In many such applications shafts or hubs are supported for rotation within hollow members, such as bearings and other mechanical supports. The shaft or hub may be driven in rotation by a prime mover, such as an electric motor or engine, or may be linked to various power transmission elements such as chain drives, belt drives, transmissions, pulleys, and so forth. In all such applications mounting structures are typically required to support the rotating and non-rotating members with respect to one another in the manner sufficient to resist loading, while still allowing for free rotation of the rotating members.

When mounting rotating elements on or within bearings, several key considerations generally come into play. For example, the bearing and associated coupling or mounting structures must be capable of withstanding the anticipated loads of the application. Moreover, the mounting structures should allow for the desired balancing or centering of loads within or about the bearing assemblies. Also, the mounting arrangements should prevent premature wear or fretting of the shaft or other mounting components, and thus provide for a maximum life in normal use. Finally, the mounting structures would ideally be relatively straightforward in application, permitting the shaft or hub and bearing assemblies to be installed without undue expense, both in terms of time and parts. The latter concern extends to dismounting or disassembling the various components for servicing and replacement when necessary.

Mounting structures have been developed that address these concerns adequately, although further improvement is necessary. For example, various tapered locking structures have been developed that force tapered members between a shaft and a mounting hub or bearing. A wide range of structures have been developed for forcing a tapered sleeve, for example, into engagement between a hollow member and a shaft. Such structures provide good mechanical support and allow for tight engagement of the hollow member and shaft. However, disassembly of such structures is often problematic, sometimes resulting in damage or destruction of a bearing assembly, a tapered sleeve, or other mechanical components of the system. In certain known arrangements the mounting components are also relatively expensive to manufacture and can be difficult to assembly and disassemble.

There is a need, therefore, for an improved system for mounting a shaft or similar mechanical component within a hollow member. There is a particular need for a straightforward and reliable system for mounting rotating elements, such as shafts, within bearing assemblies.

SUMMARY OF THE INVENTION

The present invention provides a novel technique for supporting a rotating member with respect to a non-rotating member designed to respond to such needs. While the system is described herein as applied to a hollow member in which a shaft is mounted, the invention extends to mounting of shafts, hubs, and other mechanical elements as well. Similarly, the invention is particularly well suited to mounting of shafts, hubs and other rotating elements within bearing assemblies. However, the invention might find application in the mounting of stationary members centrally, with a bearing or other rotating or non-rotating element about the central member.

The system makes use of a tapered locking arrangement in which tapered surfaces of a hollow member and of a sleeve interface with one another to allow the various components to enter into tight engagement during assembly. A locking member or nut is secured to the tapered sleeve to draw the tapered sleeve into tight engagement between the hollow member and the inner mechanical member, typically a shaft. The nut is configured with an eccentric aperture forming a groove and lip having a varying depth. The eccentric aperture permits the nut or locking member to be installed on the hollow member, such as an inner ring of a bearing assembly. Engagement of the nut on a threaded portion of the tapered sleeve centers the nut and allows the nut to be tightened to draw the assembly into tight engagement. For disassembly, the nut is rotated in an opposite direction to force the lip bordering the varying depth groove into engagement with corresponding surface of the hollow member, and thereby to force the tapered sleeve out of engagement, freeing the various components from one another.

BRIEF DESCRIPTION OF THE DRAWINGS

The foregoing and other advantages of the invention will become apparent upon reading the following detailed description and upon reference to the drawings in which:

FIG. 3 is an elevational view a locking member or nut as used in the system of FIG. 2, illustrating the eccentric aperture and varying depth groove used for mounting and operating the nut for engagement and disengagement of the system;

FIG. 4 is a side sectional view of the nut as shown in FIG. 3, illustrating various surfaces and features of the nut.

DETAILED DESCRIPTION OF SPECIFIC EMBODIMENTS

Figure 1:
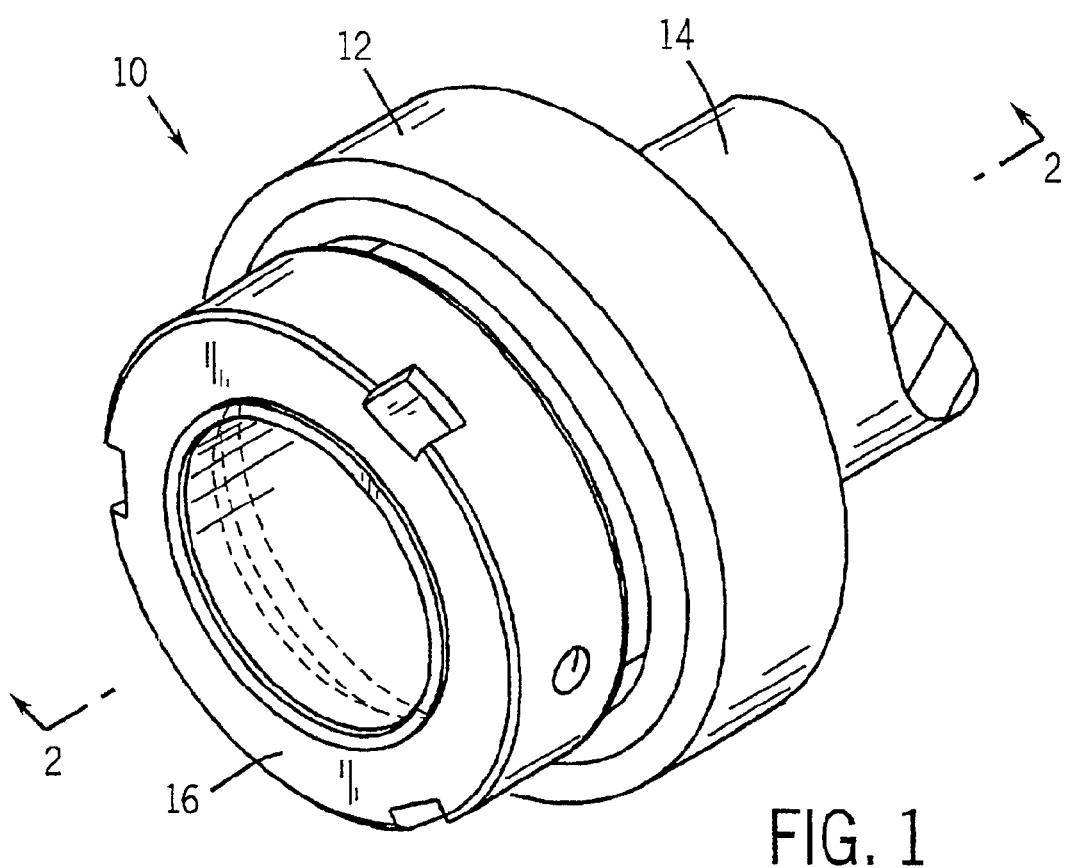
FIG. 1 is a perspective view of a mounting system in accordance with aspects of the present technique, illustrated as installed between a bearing and shaft.

Turning now to the drawings, and referring first to FIG. 1, a mounting system 10 is illustrated generally for securing a mechanical member within a hollow member. In the application illustrated in FIG. 1, the hollow member is part of a bearing assembly 12 secured on a shaft 14. As will be appreciated by those skilled in the art, many such applications exist, typically for rotating machinery and power transmission applications. As noted above, it should be borne in mind that the system described herein may be applied in various settings, including for rotating and non-rotating applications. Moreover, while a shaft is shown and described herein, various types of mechanical elements may be employed with the present system, such as hubs, various support extensions, gearing, pinions, and so forth. Similarly, while as described herein bearing 12 supports shaft 14 in rotation, in other applications, the central member, such as shaft 14 may be stationary with the bearing supporting other elements in rotation, such as in pulleys, conveyers and the like. As described in greater detail below, a nut 16 of system 10 serves to tightly engage the bearing assembly 12 and shaft 14 with respect to one another, while permitting straightforward assembly and disassembly of the system with minimal strain and unwanted loading to the bearing, shaft, and associated components.

Figure 2:
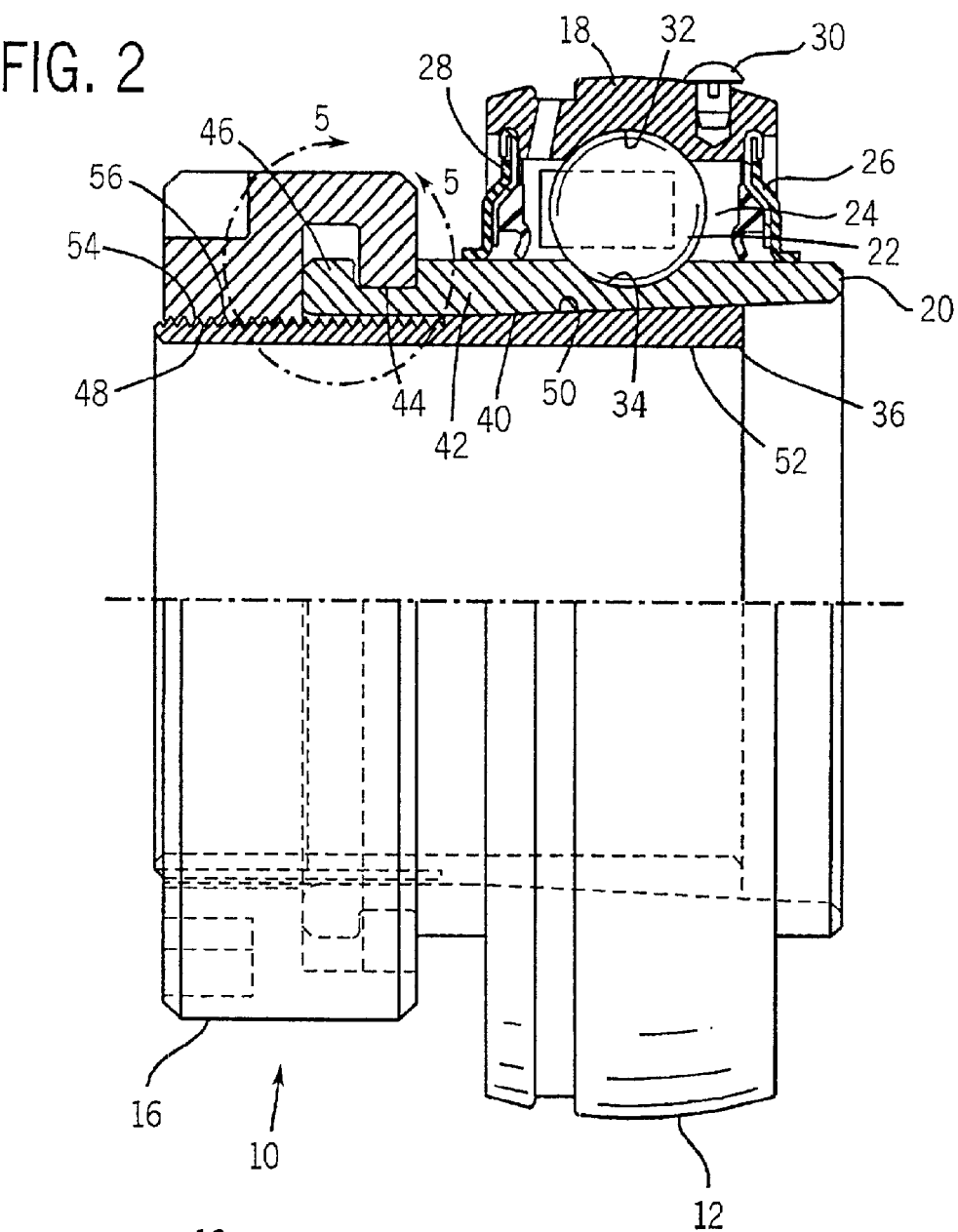
FIG. 2 is a partial sectional view of the system of FIG. 1, illustrating the engagement of the various components with respect to one another.

System 10 is illustrated in greater detail in FIG. 2. As shown in FIG. 2, in the exemplary embodiment illustrated the system is applied to a bearing assembly 12 consisting of an outer ring 18, an inner ring 20, and bearing elements 22 disposed therebetween. Outer ring 18 and inner ring 20 bound an inner volume 24 in which the bearing elements 22 are disposed. Where desired, lubricants, such as grease can be provided within the inner volume and retained by seal assemblies 26 and 28 on either side of the bearing assembly. Various other components and elements may be provided in a typical bearing assembly, such as an antirotation pin 30. As will be appreciated by those skilled in the art, bearing assembly 12 would typically be mounted within one of a variety of housing styles depending upon the mechanical configuration of the application, the anticipated loading, and so forth.

The particular configurations of the inner and outer rings of the bearing assembly facilitate operation of the bearing assembly and its interfacing with mounting structures. In the illustrated embodiment, outer ring 18 forms an outer race 32, while inner ring 20 forms and inner race 34 on which the bearing elements 22 bear. As described in greater detail below, for the present purposes, inner ring 34 serves as a hollow member in which the shaft (shown in FIG. 1) is mounted. A tapered sleeve 36 is fitted within the inner ring 20. To interface with the tapered sleeve 36, inner ring 20 has a tapered inner surface 40 inclined in a converging direction from right to left in the embodiment illustrated in FIG. 2. An extension 42 of the inner ring includes an outer annular groove 44 bounded by an annular lip 46. Lip 46 lies adjacent to a distal or end face 48 of the inner ring, which in a present embodiment serves as an abutment face during assembly of the various components.

Tapered sleeve 36 presents a tapered outer surface 50 designed to engage tapered inner surface 40 of inner ring 20. The inner surface 52 of the tapered sleeve 36 has a configuration designed to interface with the shaft in application, such as a generally right cylindrical shape in the embodiment shown in FIG. 2. It should be noted that various additional features not specifically illustrated in the figures may be included within the sleeve. For example, slits extending partially are completely through the sleeve may be provided to permit expansion or contraction of the sleeve during tightening or untightening within the assembly. Similarly, such slits may accommodate keys, splines, or other mechanical features used to secure the various elements with respect to one another and to permit transmission of torque in application. The tapered sleeve 36 further includes an externally threaded extension 54 designed to interface with nut 16 as described below.

As best illustrated in FIGS. 2, 3 and 4, nut 16 has a threaded inner surface 56 designed to be engaged on the threaded extension 54 of sleeve 36. An aperture 58 (see, e.g., FIGS. 3 and 4) is formed eccentrically on a front face of nut 16. The aperture forms an opening larger than the diametrical dimension of lip 46 of inner ring 20, such that the nut may be slipped onto the lip 46 during assembly. An internal groove 60 is formed within nut 16 so as to form a radially inwardly projecting lip 62 between the groove 60 and the eccentric aperture 58. Groove 60 is concentric with respect to the general configuration of the nut, and particularly with respect to the threaded inner surface 56. Owing to the concentricity of the groove 60 and the eccentricity of aperture 58, a lip 62 is formed which, like groove 60, has a depth which varies circumferentially around the nut. Groove 60 is bounded on a side opposite lip 62 by an abutment face 64. Finally, tool recesses 66 or similar structures are preferably provided to permit engagement of a tool (not shown) for tightening and loosening the nut in the assembly.

Referring to FIGS. 3 and 4, the threaded inner surface 56 of nut 16, and groove 60, share a central axis 68 which is generally the rotational axis of nut 16. Eccentric aperture 58, on the other hand, has an axis 70 which is displaced from axis 68 so as to form the groove and lip of varying depth. In the illustrated embodiment, the groove 60 and lip 62 have a depth which varies from a maximum depth 72 to a minimal depth 74 at a point diametrically opposed to depth 72. In the illustrated embodiment, at the point of minimum depth 74, the groove 60 is substantially flush with eccentric aperture 58. Various other configurations can, of course, be provided at which the minimum depth does not vary down to the point at which the groove and aperture are flush with one another. As noted above, and referring again to FIG. 2, the illustrated configuration of nut 16 permits the nut to be installed on the inner ring 20 and engaged on the threaded extension 54 of sleeve 36. In particular, because the eccentric aperture 58 is larger in dimension than the lip 46 of the inner ring 20, with the bearing assembly, shaft and tapered sleeve positioned loosely with respect to one another, the nut can be placed over the lip 46 and centered on the tapered sleeve. The tapered sleeve is then drawn outwardly into engagement with the nut, and the nut is threaded onto the sleeve to draw the sleeve into tight engagement between the inner ring 20 and the shaft.

Figure 5:
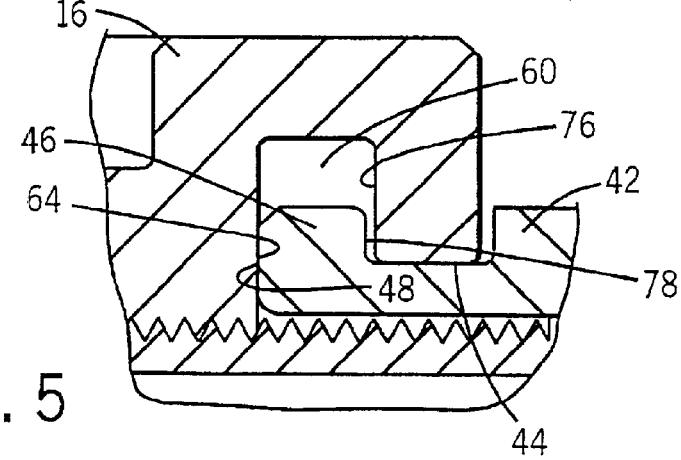
FIG. 5 is a detail view of interfacing surfaces of the nut and hollow member as illustrated in FIG. 2.

Interaction of various surfaces of the nut and inner ring 20 are best illustrated in FIG. 5. As shown in FIG. 5, as nut 16 is rotated during assembly of the system, abutment face 64 of the nut contacts the distal face 48 of the inner ring to maintain the inner ring generally in its position, while drawing the sleeve into tight engagement between the inner ring and the shaft (see, e.g., FIG. 2). In an alternative embodiment, the lip formed on the nut can be engaged on a corresponding surface of the inner ring. However, in the present embodiment, full engagement of the distal face of the inner ring and the abutment face of the nut is preferred to force tight engagement of the sleeve within the inner ring.

Disassembly of the tapered sleeve from the inner ring is effected by counterrotation of the nut. In the detail view illustrated in FIG. 5, the outer surface 76 of the varying depth lip formed on the nut engages an inner surface 78 of lip 46 of the inner ring. Although the two surfaces do not engage fully over 360°, it has been found that excellent force distribution can be obtained to cause release of the tapered sleeve from the shaft and inner ring. Again, the nut is maintained centered by engagement on the threaded extension 54 of the sleeve. Following the initial release of the sleeve and inner ring, the system can be fully disassembled by disengagement of the nut from the tapered sleeve, and removal of the inner ring, tapered sleeve, and shaft from one another.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for securing a shaft within a hollow member, the hollow member having an inner tapered surface, the system comprising:
 a hollow outer member having an tapered inner surface, a generally cylindrical extension and a concentric lip formed on the extension;
 a sleeve having an tapered outer surface configured to interface with the tapered inner surface of the hollow member, an inner surface configured to interface with a shaft, and a threaded extension; and
 a locking member having a threaded inner section configured to mate with the threaded extension of the sleeve, and an eccentric aperture forming a varying depth inner groove configured to mate with the concentric lip of the hollow outer member.

2. The system of claim 1, wherein the concentric lip of the hollow outer member is defined by an annular groove formed within the extension.

3. The system of claim 2, wherein the locking member abuts a distal face of the hollow outer member for engagement with the threaded extension of the sleeve for drawing the sleeve into engagement between the hollow outer member and the shaft.

4. The system of claim 3, wherein a lateral wall of the inner groove of the locking member abuts the lip of the hollow outer member to urge the sleeve out of engagement with the hollow outer member and the shaft.

5. The system of claim 1, wherein the hollow outer member comprises an inner ring of a bearing assembly.

6. The system of claim 1, wherein the eccentric aperture of the locking member is of larger diameter than an outer diameter of the lip of the hollow outer member.

7. The system of claim 6, wherein the groove formed by the eccentric aperture of the locking member varies in depth from a maximal depth to substantially flush with the central aperture.

8. The system of claim 1, wherein the locking member is centered with respect to the hollow outer member by threaded engagement with the sleeve.

9. A system for assembly and disassembly of a bearing and shaft, the system comprising:
 a shaft;
 a bearing assembly configured for mounting about the shaft, the bearing assembly including an inner ring having a tapered inner surface, a cylindrical extension and an annular outer groove forming a lip on the extension;
 a sleeve configured for assembly between the shaft and the inner ring, the sleeve having a tapered outer surface to interface with the tapered inner surface of the inner ring, an inner surface to interface with the shaft, and an externally threaded extension; and
 a nut having a threaded inner surface for interfacing with the threaded extension of the sleeve, and an eccentric aperture forming an inner groove of varying depth for interfacing with the lip of the inner ring.

10. The system of claim 9, wherein the inner groove of the nut forms a lip of varying depth.

11. The system of claim 10, wherein the lip of the nut and the annular outer groove of the inner ring are dimensioned to permit a distal face of the inner ring to abut the nut during threaded engagement of the sleeve and nut for drawing the sleeve between the inner ring and the shaft.

12. The system of claim 9, wherein a lateral wall of the inner groove of the nut abuts the lip of the inner ring to urge the sleeve out of engagement with the inner ring and the shaft.

13. The system of claim 9, wherein the eccentric aperture of the nut is of larger diameter than an outer diameter of the lip of the inner ring.

14. The system of claim 13, wherein the inner groove of the nut varies in depth from a maximal depth to substantially flush with the central aperture.

15. The system of claim 9, wherein the nut is centered with respect to the inner ring by threaded engagement with the sleeve.

16. A method for assembling a hollow member and a shaft, the hollow member having a tapered inner surface and a cylindrical extension presenting an annular outer groove forming a concentric lip, the method comprising
 assembling a tapered sleeve between the hollow member and the shaft, the tapered sleeve having a tapered outer surface to interface with the tapered inner surface of the hollow member, an inner surface to interface with the shaft, and an externally threaded extension;
 assembling a locking member on the sleeve, the locking member including an inner threaded section to interface with the threaded extension, and an eccentric aperture forming a varying depth groove for receiving the lip of the hollow member; and
 tightening the locking member on the sleeve to draw the sleeve into engagement between the hollow member and the shaft.

17. The method of claim 16, wherein the eccentric aperture of the locking is of larger diameter than the lip of the hollow member.

18. The method of claim 16, comprising the further step of tightening a set screw in the locking member to prevent loosening of the locking member.

19. The method of claim 16, wherein as the locking member is tightened on the sleeve, the locking member abuts the hollow member.

20. The method of claim 19, wherein a body portion of the locking member abuts the hollow member for tightening of the locking member on the sleeve.

21. A method for disassembling a bearing and shaft, the method comprising:
 rotating a locking member on a tapered sleeve positioned between a bearing inner ring and a shaft, the inner ring having a tapered inner surface and a cylindrical extension presenting an annular groove, the tapered sleeve having a tapered outer surface interfacing with the tapered inner surface of the inner ring, and a threaded extension, the locking member having a threaded inner section engaging the threaded outer surface of the sleeve, and an eccentric aperture forming a varying depth groove, a side wall of the varying depth groove contacting a side wall of the annular groove of the inner ring to force relative displacement of the inner ring and the tapered sleeve.

22. The method of claim 21, wherein the varying depth groove has a depth varying from a maximal depth to substantially flush with the eccentric aperture.

23. The method of claim 21, further comprising loosening a set screw in the locking member prior to rotating the locking member on the tapered sleeve.

* * * * *